Aug. 8, 1950   J. F. O'BRIEN ET AL   2,517,593
OUTLET UNIT ASSEMBLY
Filed Oct. 26, 1946   2 Sheets-Sheet 1
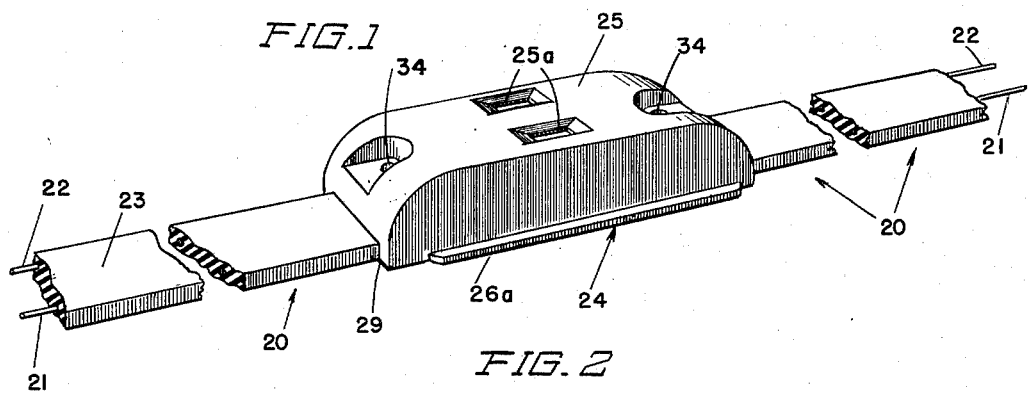
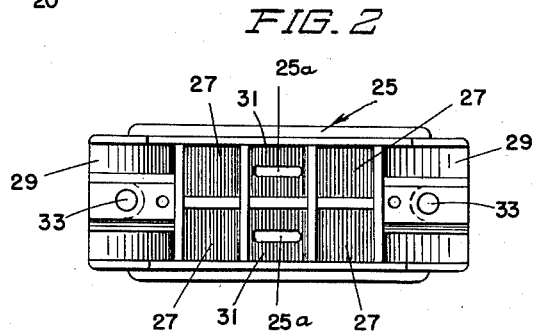
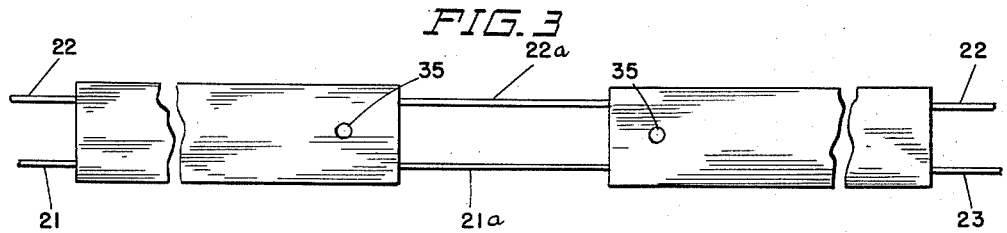
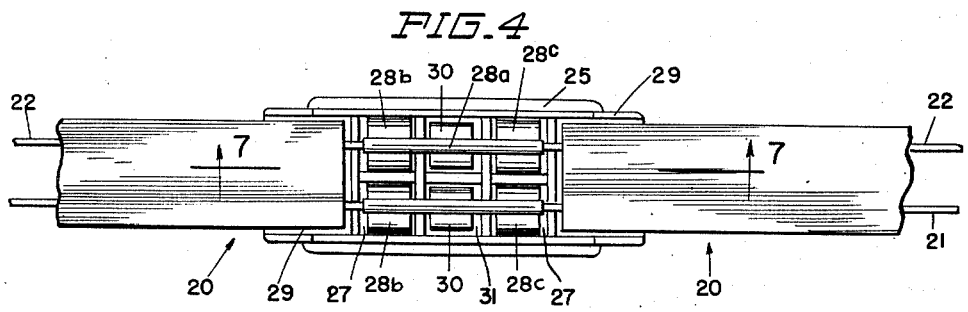
INVENTORS
JOSEPH F. O'BRIEN
LOUIS G. MORTEN
BY
Henry J. Lucke
ATTORNEY

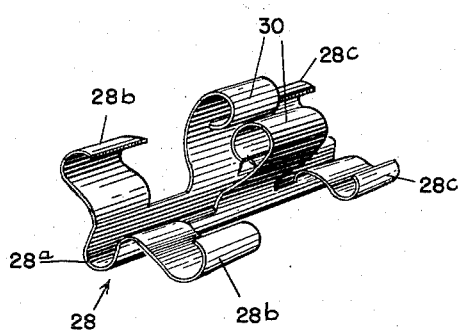
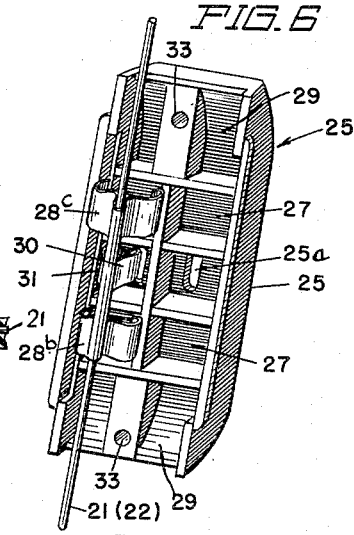
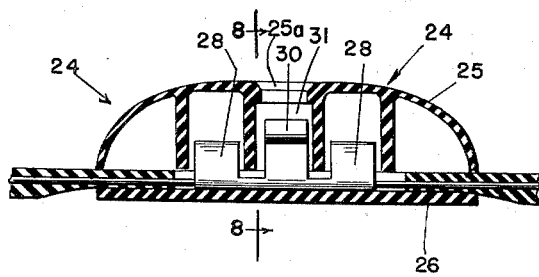
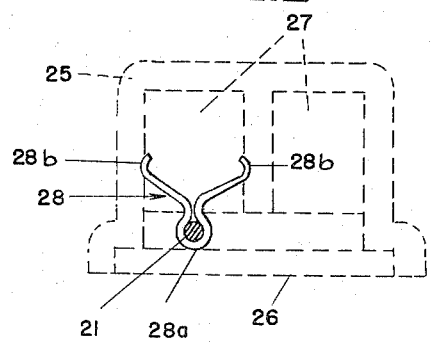
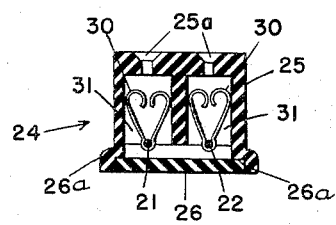
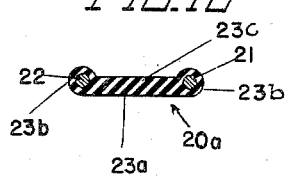

Patented Aug. 8, 1950

2,517,593

UNITED STATES PATENT OFFICE 2,517,593

OUTLET UNIT ASSEMBLY

Joseph F. O'Brien, Lebanon, and Louis G. Morten, Teaneck, N. J., assignors to John B. Pierce Foundation, New York, N. Y., a corporation of New York Application October 26, 1946, Serial No. 705,915

2 Claims. (Cl. 173—338)

1

The invention relates to improvements in outlet unit assemblies.

An object of the invention is to provide conductor-carrying strip types of surface wiring and improved outlet units, constructed to afford the employment of the conductor-carrying strip in indefinite length and to assemble one or more outlet units at any desired locations longitudinally of the strip affording good electrical connections of the respective outlet contacts of the outlet unit with the electrical conductors of the strip without severment of the electrical conductors.

Pursuant to preferred embodiments of the invention, the outlet unit is provided with a member of electrical conducting material for association with each electrical conductor of the wiring strip, each member embodying outlet contacts and arranged to make pressure engagement with its electrical conductor by embracement by such member about such electrical conductor under compression, each member being provided with supplemental means constructed and arranged within the housing of the outlet unit to maintain such good electrical connection, and to effect good electrical engagement of its outlet contacts with the blades of an electrical plug inserted in the apertures of the outlet unit.

In the most preferred forms of the invention, each such member, hereinafter termed outlet contact and conductor-embracing member, includes wings oppositely disposed relative to the body of the member, cooperating with recesses in the cover part arranged to receive such wings and dimensioned with respect to the spread of the wings to positively retain the member within the outlet unit and concomitantly with such compression of its wings to exert sufficient pressure engagement of the body portion of the member with its associated electrical conductor to maintain good electrical connection therewith.

The assembly of the conductor strip with the outlet unit affords complete coverage of the bared portions of the conductors, thereby safeguarding against shock. Preferably, the outlet unit extends at its opposite ends over body portions of the strip and the securement of the cover part of the unit to its base, as by screws or like fastening means, effects securement also of the respective body portions of the strip, and in addition securement of the assembly to a suitable support.

Preferred types of electrical conductor-carrying strips are disclosed in the co-filed application Ser. No. 705,918, filed October 26, 1946, entitled "Electrical Conductor-Carrying Assemblies."

Further features and objects of the invention

2 will be more fully understood from the following detailed description and from the accompanying drawings, in which:

Fig. 1 is a perspective view of a preferred embodiment of the invention, illustrating the outlet unit associated with a substantially flat type of electrical conductor-carrying strip.

Fig. 2 is a bottom plan view of the cover part of the outlet unit.

Fig. 3 is a top plan view of the electrical conductor-carrying strip, showing the removal of a portion of its insulating body to bare the electrical conductors for a length embraced within the cover of the outlet unit, shown in Fig. 2.

Fig. 4 is a bottom plan view of the assembly of the cover part of the outlet unit, including its outlet-contact and conductor-embracing members and the electrical conductor strip shown in Fig. 3, the body part of the outlet unit having been removed.

Fig. 5 is a perspective view on an enlarged scale of one of the outlet-contact and conductor-embracing members.

Fig. 6 is a bottom perspective view of the cover part of the outlet unit, illustrating a single outlet-contact and electrical conductor-embracing member at a stage preparatory to being inserted into placement in the cover part.

Fig. 7 is a longitudinal sectional view of the outlet unit, taken on line 7—7 of Fig. 4.

Fig. 8 is a detail sectional view taken on line 8—8 of Fig. 7.

Fig. 9 is a schematic view illustrating a manner of compressing the wings of the outlet-contact and electrical conductor-embracing member, and its lodgment within recesses in the cover part of the outlet unit.

Fig. 10 is a transverse sectional view of an electrical-carrying strip of another embodiment of the flat type, applicable in carrying out the invention.

Referring to the drawings, 20 represents generally the electrical conductor-carrying strip, in this instance embodying two electrical conductors 21, 22 embraced in a suitable insulating material, such as a suitable plastic 23. In Figs. 1, 3, 4 and 7 the electrical conductor-carrying strip 20 is shown as flat at its opposite sides and of substantially true rectangular cross section. The electrical conductor strip 20a, illustrated in Fig. 10, is shown embodying two electrical conductors 21, 22, embedded in the electrical insulating material 23a, the configuration of which is substantially flat at its bottom face, the opposite terminal portions 23b, 23b of which are circular merging with the top flat face 23c.

The outlet unit is designated generally 24 and comprises a cover part 25, see Figs. 2, 6, 7 and 8, and a bottom part 26, see also Fig. 4.

The cover part 25 is provided with apertures 25a, 25a for the reception of the blades of conventional or other approved electrical plug, referred to more fully hereinafter. The cover part comprises recesses 27, shown four in number, functioning, as set forth more fully hereinafter, to receive under compression the wings of the outlet-contact and conductor-embracing members 28, see particularly Figs. 4, 6, 7 and 8. These recesses 27 are arranged in sets, in this instance two in number, the recesses of each set being disposed longitudinally of one another in the cover part 25 of the outlet unit.

The cover part 25 includes also entry recesses 29 at its opposite ends, fashioned or formed in the cover part, serving to receive and conceal the body of the electrical conductor strip 20 and the bared portions of the electrical conductors. The bottom part 26 of the outlet unit 24 is shown in the form of a flat plate, which may be fashioned or molded with opposite longitudinally extending ridges 26a, see Fig. 8, received within lateral cut-out recesses in the lower lateral edge portions of the cover part 25.

The cover part 25 and the bottom part 26 are preferably formed of thermosetting plastic, but may be formed of other types of plastic or other suitable material possessing electrical insulating properties such as fiber board.

Preferred embodiments of each outlet-contact and conductor-embracing member are formed of resilient metal, desirably of phosphor bronze. Such preferred form of the stated member 28, as illustrated in Fig. 5, comprises an arcuately configurated body portion 28a contoured in accordance with the diameter of the electrical conductor to be embraced, a pair of mutually co-acting wings 28b, 28b at one end of the body portion, a second pair of similar wings 28c, 28c at the opposite end of the body portion; the outlet contacts 30 are shown disposed intermediate the said pairs of wings and formed to be positioned vertically above the longitudinal axis of the body portion. Additionally, the outlet contacts are preferably formed to engage one another under pressure, whereby upon insertion of a blade of an electrical plug, the blade makes pressure engagement with the pair of contacts, affording good electrical engagement and wiping of the contacts.

Fig. 9 illustrates diagrammatically, and Fig. 6 perspectively, the placement and securement of an outlet-contact and conductor-embracing member 28. Each such member is shown comprising a pair of wings such as 28b, 28b, the normal spread of such wings being greater than the corresponding dimension of its receiving and retaining recess 27 of the cover part, whereby upon placing such pair of wings within such recess 27 the wings are compressed toward one another, as by pushing the wings into the recess 27, the arcuate formation of the wings facilitating the compression of the wings and their entry into the recess. The wings 28c, 28c are similarly compressed and inserted under mutual compression into its recess 27. By such compression of the two sets of wings of the member 28, its body portion 28a is brought under pressure into peripheral engagement with its associated electrical conductor, such as the conductor 21, as indicated in Figs. 6 and 9.

Upon placement of the two pairs of wings of the outlet-contact and conductor-embracing member 28 within their respective recesses 27 of the cover 25, its pair of outlet contacts 30 are inserted within its recess 31 of the cover part 25, to be positioned in proper vertical alignment with an outlet aperture 25a in the cover 25 of the outlet unit. Thus, each recess 31 of the cover part constitutes a recess communicating with an aperture 25a, and when a pair of outlet contacts 30, 30 are positioned therein, a plug blade inserted through the aperture 25a will make contact with the contacts.

The cover 25 and the base 26 are mechanically secured to one another by suitable means. As shown in Fig. 1, and indicated in Figs. 2 and 6, such securement may be had by providing the perforations 33 in the cover adjacent its respective ends and therewith registering perforations in the base 26, for the reception of screws 34, serving also to secure the outlet unit to a suitable support. Such screws 34 pass also through the body of the electrical conductor-carrying strip 20, causing openings, indicated at 35, 35 in Fig. 3, in the strip.

Preferably, as indicated in Fig. 8, the outlet contacts 30 are configurated and dimensioned to normally engage at their outward faces the juxtaposed inward faces of their respective recesses 31, whereby upon insertion of the blades of an electrical plug, such blades are engaged under pressure by the effective end portions of the contacts, thus insuring good electrical connection, stable engagement of the plug, automatic wiping of the effective faces of the contacts, and imparting long life to the material of the outlet contacts.

It will be observed that coincident with the molding of the walls of the recesses 27 receiving the wings 28b, 28b and 28c, 28c respectively, a slight inwardly converging taper is imparted to the opposing walls, such taper facilitating the insertion and relative compression and the lodgement of the mutually cooperating pairs of retaining wings respectively. Similar provision is made in the like tapering of the walls of the recesses 31 receiving the outlet contacts 30 respectively.

The combinational feature of an electrical conductor-carrying strip having its conductors bared and unsevered may be similarly carried out with relation to any unit provided with an electrical contact, other than an outlet unit, as is apparent from the foregoing and the accompanying drawings.

We claim:

1. An outlet unit comprising a housing consisting of a cover part and a complementary base part, said cover part having therein a set of outlet apertures and having formed therein an internal recess communicating with each aperture and separate recesses longitudinally related to each aperture-communicating recess; and a plurality of outlet-contact and conductor-embracing members corresponding in number to that of the outlet apertures in said cover part, each of said members being formed of resilient electrically conductive material and comprising an arcuately configurated conductor-engaging body portion, a pair of outlet contacts integral with said body portion for entering an aperture-communicating recess of said cover part, and a pair of mutually coacting wings integral with said body portion for entering a recess in said cover part longitudinally related to the aperture-communicating recess entered by the outlet contacts of said body portion, said wings being formed with a normal spread greater than the corresponding dimension of the cover portion recess which it enters, whereby said pair of wings will be compressed therein to press the body portion of said conductor-embracing member into close peripheral engagement with a conductor therein.

2. An outlet unit comprising a housing consisting of a cover part and a complementary base part, said cover part having therein a set of outlet apertures and having formed therein an internal recess communicating with each aperture and a separate recess longitudinally related to each aperture-communicating recess at each end thereof; and a plurality of outlet-contact and conductor-embracing members corresponding in number to that of the outlet apertures in said cover part, each of said members being formed of resilient electrically conductive material and comprising an arcuately configurated conductor-engaging body portion, a pair of outlet contacts integral with said body portion for entering an aperture-communicating recess of said cover part, and a pair of mutually coacting wings integral with said body portion positioned beyond each end of said pair of outlet contacts for entering recesses in said cover part longitudinally related to the aperture-communicating recess entered by the outlet contacts of said body portion at each end thereof, said pairs of wings being formed with a normal spread greater than the corresponding dimension of the cover portion recesses which they enter, whereby said pairs of wings will be compressed therein to press the body portion of said conductor embracing member into close peripheral engagement with a conductor therein.

JOSEPH F. O'BRIEN.
LOUIS G. MORTEN.

REFERENCES CITED

The following references are of record in the file of this patent:

UNITED STATES PATENTS

| Number | Name | Date |
|---|---|---|
| 1,751,299 | Wermine | Mar. 18, 1930 |
| 1,932,746 | McArdle | Oct. 31, 1933 |
| 2,279,516 | O'Brien | Apr. 14, 1942 |